United States Patent [19]

Cambon

[11] Patent Number: 4,859,522

[45] Date of Patent: Aug. 22, 1989

[54] MULTI-COAT NONSKID SURFACING

[75] Inventor: Christian Cambon, Le Colombet Sanary, France

[73] Assignee: Etat Francais as represented by the Delegue general pour l'armement, Paris, France

[21] Appl. No.: 888,382

[22] Filed: Jul. 23, 1986

[30] Foreign Application Priority Data

Jul. 26, 1985 [FR] France ............................ 85 11430

[51] Int. Cl.$^4$ ........................... B32B 5/16; C09B 3/72
[52] U.S. Cl. .................................... 428/215; 428/324; 428/325; 428/328; 428/423.3; 428/424.4; 428/424.6; 428/908.8; 428/543
[58] Field of Search ............ 428/324, 325, 328, 423.3, 428/424.4, 424.6

[56] References Cited

U.S. PATENT DOCUMENTS

| | | | |
|---|---|---|---|
| 3,852,100 | 12/1974 | Argabright et al. | 428/543 |
| 3,935,365 | 1/1976 | Eigenmann | 428/331 X |
| 4,020,211 | 4/1977 | Eigenmann | 428/483 X |
| 4,082,884 | 4/1978 | De Long | 428/543 |
| 4,336,293 | 6/1982 | Eiden | 428/424.6 X |

Primary Examiner—P. C. Ives
Attorney, Agent, or Firm—Oliff & Berridge

[57] ABSTRACT

The invention has as its object multi-coat nonskid surfacings which comprises one or more priming coats and one or more nonskid coats. Each coat comprises a base and a hardener which are mixed before use. The bases contain in particular hydroxylated vinyl terpolymer resins and the hardeners contain a polyisocyanate which reacts with these resins to yield cross-linked polymers known as polyvinyl urethane. The figure represents comparative wear tests. Curves C1 to C3 represent the results measured on known surfacings. Curve C4 represents the results measured on a surfacing according to the invention.

One application is the protection of ship decks, particularly flight decks, or offshore oil prospecting platforms.

17 Claims, 1 Drawing Sheet

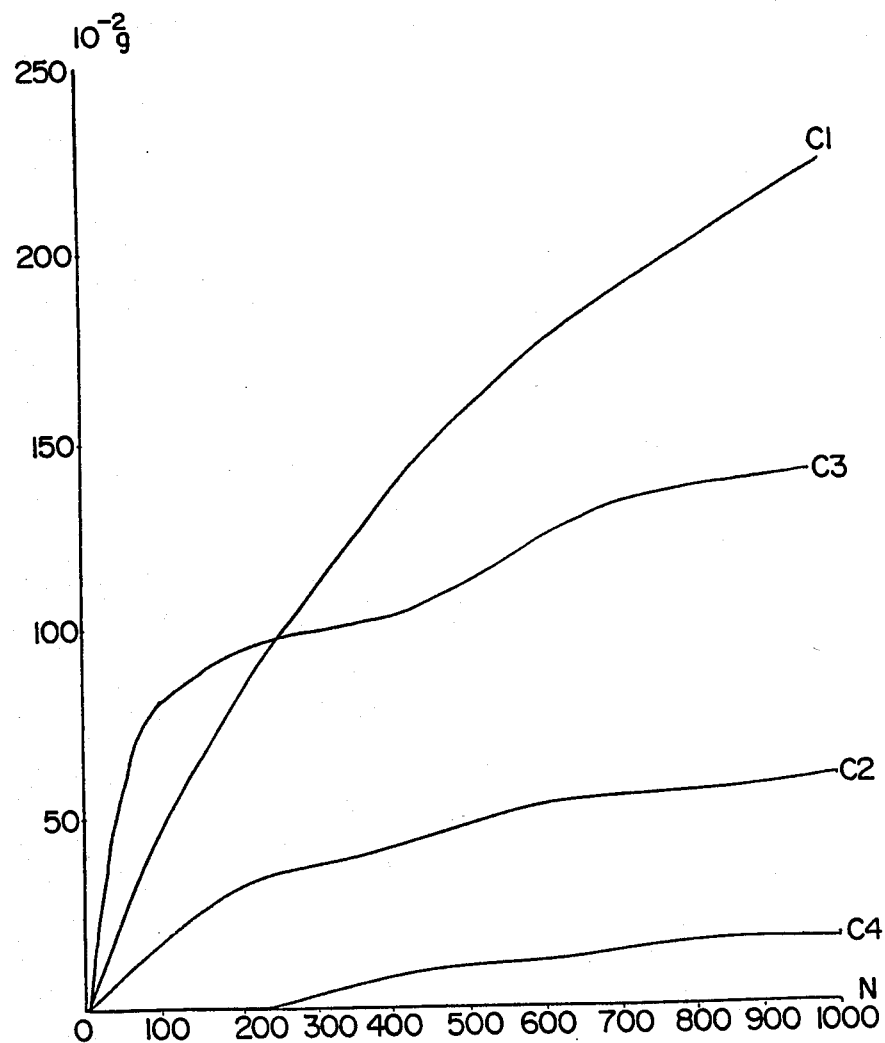

MULTI-COAT NONSKID SURFACING

The present invention has as its object multi-coat nonskid surfacings intended more particularly for the protection of ship decks, particularly flight decks of aircraft carriers and helicopter carriers, this application not being limiting.

The technical field of the invention is that of the fabrication of protective paints and surfacings.

Decks of ships, particularly flight decks of aircraft carriers or helicopter carriers, as well as decks of offshore oil prospecting and recovery platforms, and also the gangways or passageways for moving handling machinery in factories or warehouses, floors of gymnasiums, etc., are subjected to repeated causes of abrasion and necessitate very durable surfacings which resist the causes of abrasion if it is desired to avoid frequent restoration work. Also, these surfacings must be nonskid surfacings.

Experience shows that the need for nonskid multi-coat surfacings is increasing from year to year and that the labor cost for installing and maintaining known surfacings of this type is very high. The known surfacings of this type still have insufficient performances, which leads to frequent maintenance and restoration works and to potential dangers in service.

The object of the present invention is to procure provide nonskid surfacings which at have at the same time very good resistance to mechanical loads (impacts, erosion, wear or abrasion), to chemical attacks (solvents, hydrocarbons, oils, greases, detergents, sea water, corrosion) and to physical loads (ultraviolet rays, fire, bad weather).

Fire resistance and flame propagation is a very important factor in the applications to ship decks, particularly to flight decks, and to offshore oil prospecting platforms.

The nonskid surfacings according to the invention are multi-coat surfacings which comprise, in a manner known from the prior art, one or more thin priming coats, i.e., ground coats, usually two coats, having anticorrosive or bonding properties, which are applied directly on the substrate to be protected, for example, on metal laid bare by brushing, sanding or sand-blasting, having been subjected to surface treatment, for example, by a wash primer, or on any other appropriate material such as wood, resin-bonded glass-fiber laminates, various alloys, concrete, etc.

The priming coats are applied by the traditional methods of applying paint (pain brushe, artists's brush, paint roller. These are thin coats, having a total thickness of between 30 and 100 microns of dry film.

The function of the priming coats is to protect the metal against corrosion and to adhere strongly to both the substrate and the nonskid coats, in order to obtain an aggregate coating which has strong inter-coat cohesion and high surface bonding strength on the order of 80 kg/cm$^2$.

The priming coats contribute to imparting high resistance to flame propagation to the surfacing.

In addition, the priming coats must be resistant to corrosive solvents and particularly to softening by the solvents of the nonskid coats when these are applied in thick coats on the priming coats.

The nonskid surfacings embodying the invention comprise, in addition, one or more thick coats, usually two coats, which cover the priming coats and which have nonskid properties and properties of resistance to wear, to abrasion, to bad weather, to solvents, to flame propagation and to impacts.

The nonskid coats of a surfacing incorporating the invention are applied with a spatula or with a trowel. Each coat has a thickness of between 300 and 1000 microns depending on the particle size of the mineral aggregates and fillers.

The surfacings embodying the invention are surfacings to be prepared from cross-linked resins. Each coat comprises two separate components, a base which contains the cross-linkable resins and a polyisocyanate-base hardener which, when mixed at the moment of use, react at ambient temperature to form surfacings of the type known as polyvinyl urethanes.

The object of the invention is achieved by means of surfacings in which the bases of the priming coats and of the nonskid coats both contain hydroxylated vinyl terpolymrs, which are copolymers of vinyl chloride, one or more vinyl esters and one or more hydroxylated esters containing reactive hydroxy groups. These vinyl terpolymers react at ambient temperature with the polyisocyanate of the hardener to yield a cross-linked resin known as polyvinyl urethane.

Similar compositions are already employed in the fabrication of varnishes. For example, French Patent 2,209,811 describes a composition containing a vinyl chloride polymer having reactive hydroxy groups. The terpolymers contain a high proportion of vinylidenes chloride or vinyl acetate and only react in the hot with hardeners comprised of isocyanate resins which, in fact, are precursor polymers of polyurethane. The use of a thermosetting resin is not contemplated in the fabrication of a nonskid surfacing which must be used at ambient temperature. French Patent 2,160,658, too, describes reactive vinyl copolymers rich in vinyl acetate, which are therefore specially chosen for their compatibility with nitrocellulose for the fabrication of varnishes. These terpolymers are mixed with an already formed polyurethane resin, which therefore does not constitute a polyisocyanate such as that used as hardener reacting at ambient temperature with a base, in the case of the compositions for a nonskid surfacing of the invention.

According to one preferred embodiment, the base (element A) of the priming coats of a surfacing according to the invention contains the following components, in the proportions indicated, which are proportions by weight relative to the total weight of the base:

a vinyl terpolymer comprised vinyl chloride in a proportion of between 65% and 98% by weight of the terpolymer, of one or more vinyl esters, for example vinyl acetate in a maximum proportion of 10% by weight of the terpolymer, and of one or more hydroxylated esters, having reactive hydroxy groups, for example a hydroxylated alkyl acrylate, in proportions between 5% and 25% of the total weight, and preferably on the order of 12%. This terpolymer contains between 1% and 4%, and preferably 2%, of its weight of reactive hydroxy groups (OH). These are OH groups which react with the isocyanate groups (NCO) to yield a cross-linked copolymer belonging to the family of halogenated polyurethane known as polyvinyl urethane, according to the general reaction:

$$R1-OH+R2-NCO=R2NH-COOR1$$

hydroxylated polyisocyanate polyvinyl vinyl terpolymer urethane a copolymer of vinyl chloride, in a proportion of 80 to 90% by weight of the coplymer, and one or more vinyl esters, for example vinyl acetate, in a maximum proportion of 20% by weight of the copolymer, in which a large part of the carboxy group (up to 80%) can be hydrolyzed to polyvinyl alcohol, in proportions between 0 and 10% and preferably 2% of the total weight of the base. This copolymer functions as an adhesion promoter and provides the surfacing with its flexibility.

an antimony oxide, preferably antimony trioxide, $Sb_2O_3$, in proportions between 1% and 40%, preferably between 15% and 20%, of the total weight. The antimony oxide contributes to imparting fire-resistance properties to the surfacing. It reacts with the chlorine of the vinyl chloride to form a flame-retarding product.

one or more corrosion-inhibiting pigments, for example zinc tetroxychromate, calcium ferrite or zinc phosphate, in proportions of between 5% and 30%, preferably of between 10% and 15%, of the total weight.

various organic or mineral coloring pigments and fillers permitting the covering power to be increased and the desired tint to be obtained, for example carbon black, iron or chromium oxides, talc, etc., in proportions of between 0 and 20% of the total weight, as the case may be.

oxygenated solvents, preferably ketones, for example methyl ethyl ketone or methyl isobutyl ketone, in proportions of between 10% and 50%, and preferably on the order of 34%, of the total weight.

aromatic solvents in proportions of between 0 and 40%, and preferably on the order of 14%, of the total weight.

In addition to these essential constituents, the base of the priming coats may contain various additives permitting the reactivity and the performances of the paint to be improved, particularly one or more thixotropic agents such as modified hydrogenated castor oil or bentonite in proportions of between 0 and 3% of the total weight, surfactants and dispersants such as esters of anionic acids in proportions of between 0 and 2% of the total weight; cross-linking accelerators, preferably an amino ester inproportions of between 0 and 2%.

The hardener (element B) of the priming coats is a polyisocyanate, preferably aromatic, containing a proportion of isocyanate groups of between 10% and 40%, preferably 22%, of the weight of the dry product, which is preferably in solution in a solvent chosen from among the aromatic solvents, the esters, the glycol ether esters and the ketones. The properties of solvent is between 0 and 60% of the weight of hardener, preferably on the order of 33%.

Before applying a priming coat, the base and the hardener are mixed. With a hardener containing 67% of dry product, between 1 gram and 10 grams of hardener, and preferably on the order of 6 grams, is mixed with 100 grams of base.

According to one preferred embodiment, the base (element A) used for preparation of the nonskid ground coats contains the essential components listed hereinafter, in the proportions indicated, which are proportions by weight relative to the total weight of the base:

a hydroxylated vinyl terpolymer comprised of vinyl chloride between 65 and 95% by weight of the terpolymer, of one or more vinyl esters, for example vinyl acetate in a maximum proportion of 10% by weight of the terpolymer, and one or more hydroxylated esters, for example hydroxylated alkyl acrylates. The proportion of terpolymer is between 1% and 25%, and preferably 7.5%, of the total weight.

The proportion of reactive hydroxy groups in this terpolymer is on the same order as in the base of the priming coats, i.e., between 1% and 4%. This vinyl terpolymer making up part of the composition of the base of the nonskid coats is of the same family, and preferably is the same, as that which makes up part of the composition of the base of the priming coats.

another vinyl terpolymer, of lower molecular weight than the preceding and richer in hydroxy groups, for example containing between 2% and 5% of its weight of hydroxy groups, preferably 3%, these latter being more reactive towards the isocyanate groups of the hardener. The proportion of this second terpolymer is between 0.1% and 25%, and preferably 4.5%, of the total weight of the base.

antimony oxide, preferably antimony trioxide, $Sb_2O_3$, in proportions between 1% and 40%, preferably 12.7%.

a rough-surfaced lamellar mineral filler, which is preferably a mixture of chlorite (hydrosilicate of magnesium, potassium and aluminum), mica and quartz, in proportions between 0 and 30%, and preferably on the order of 10%.

This mineral filler has an important function. It increases the internal cohesion of the coat and it contributes to imparting a high resistance to impacts and abrasion to this coat.

a nonskid aggregate having particle sizes between 0.1 and 1.5 millimeters, which is preferably quartz, but which can also be glass or boron powder, silicon carbide or tungsten carbide powder, glass or corundum particles, metal grains, particles of pumice stone, slag, siliceous sand, particles of plastic materials, boron nitride, etc.

The proportion of nonskid aggregate in the base is between 2% and 70%, and preferably on the order of 25%. This aggregate, comprised of hard grains, imparts its non-skid and abrasion-resistance properties to the coat.

oxygenated solvents, preferably ketones in proportions of between 10% and 50%, preferably on the order of 21%.

aromatic or aliphatic solvents in proportions of between 0 and 40%, preferably on the order of 8%.

In addition to these essential components, the base of the nonskid coats may advantageously contain:

one or more thixotropic agents, for example modified hydrogenated castor oils or bentonites in proportions of between 0 and 3%.

pigments (titanium dioxide, carbon black, iron oxides, etc.).

mineral fillers such as talc, micas, in proportions of between 0 and 40%.

various additives such as dulling agents, surfactants or dispersants such as anionic acid esters or soybean lecithin.

The hardener used for cross-linking the nonskid coats contains a polyisocyanate, preferably aliphatic, containing a proportion of isocyanate groups relative to the weight of dry products of between 10% and 40% and, preferably, on the order of 17.5%.

Preferably, this polyisocyanate is in solution in a solvent chosen from among the aromatic solvents, the esters, the glycol ether esters or the ketones. The proportion of solvent is between 0 and 70% of the total weight of the hardener and, preferably, on the order of 25%.

Before applying the nonskid coats, the base and the hardener are mixed in proportions of 0.5 to 15, preferably 3, g of hardener per 100 g of base.

The base of the priming coats is fabricated by the usual processes in the manufacture of paints. The solid components (resins, antimony oxide, pigments, etc.) are finely ground in a mixture with the solvents.

The base of the nonskid coats is preferably fabricated by following the steps described hereinbelow. After the resins are dissolved, all the solid products, except for the lamellar mineral filler and the nonskid aggregates, are finely ground in the presence of part of the solvents.

On completion of the grinding, a dulling agent and the lamellar mineral filler are incorporated, if desired. The contents of the grinder are emptied into tanks. The grinder is rinsed with the remaining solvent.

The whole is homogenized by agitation in the tank, after which it is prepared in vessels.

The nonskid aggregates, in the required proportions, are incorporated directly into the vessels for preparing the base.

The invention results in surfacings with very good qualities of mechanical surface bonding strength and abrasion resistance. The service life of a surfacing of the invention is two to five times longer than that of nonskid surfacings known heretofore.

The surfacings according to the invention have very good nonskid properties, and very high resistance to even aggressive solvents and to corrosion in a marine atmosphere.

They are immune to ultraviolet and are perfectly nonflammable.

The single figure represents comparative wear tests carried out by means of a heavy abrasive skid of boron carbide and epoxy resin, which was moved back and forth on the surface of the nonskid surfacings.

The abscissa values represent the number of traverses by the abrasive skid. The ordinate values represent the weight loss in centigrams for samples of known surface area.

Curves C1, C2 and C3 represent the results measured on three known nonskid surfacings used by various navies for the protection of ship decks, of diverse chemical natures, such as nitrile rubbers or phenolic resins. Curve C4 represents the results measured on a nonskid surfacing incorporating the invention.

The performances and the wear resistance of the surfacings according to the invention are due to the composition of the priming coats and of the nonskid coats, which leads to synergy of properties between the various components.

The results of other comparative tests are grouped hereinbelow. Prolonged exposure (600 hours) to ultraviolet radiation shows that the chalking resistance of the products denoted C1 to C3 is poor (chalking, severe discolorations and even cracks), whereas surfacing C4 according to the invention does not show any change after exposure. The three known surfacings C1 to C3 exhibit numerous inflammatory phenomena (flames and large sparks), whereas surfacing C4 withstands a flame-propagation test.

The surface bonding strength of C4 is 80 kg/cm$^2$ at 25° C. and 50 kg/cm2 at 50° C., whereas the figures for surfacings C1 to C3 vary from 15 to 27 kg/cm2 at 25° C. and from 5 to 13 kg/cm2 at 50° C.

Surfacing C4 was found to have a high resistance to contact with hydrocarbons or oils, whereas the prior art surfacings are impregnated and become soft.

Finally, surfacing C4 could be stored for more than 18 months at ambient temperature, whereas the other known surfacings lost their properties after 6 months of storage under the same conditions.

I claim:

1. A multi-coat nonskid surfacing for a substrate, comprising:

a priming coat applied directly to said substrate, said priming coat comprising a priming coat base component containing a hydroxylated vinyl terpolymer which is a copolymer of vinyl chloride, a vinyl ester and a hydroxylated ester with reactive hydroxy groups; and a priming coat hardener containing a polyisocyanate; and a nonskid coat applied to said priming coat, said nonskid coat comprising a nonskid coat base component containing a hydroxylated vinyl terpolymer which is a copolymer of vinyl chloride, a vinyl ester and a hydroxylated ester with reactive hydroxy groups, and particles of a nonskid aggregate having particle sizes of from 0.1 to 1.5 mm; and a nonskid coat hardener containing a polyisocyanate;

wherein the hydroxylated vinyl terpolymer of the priming coat base component and the polyisocyanate of the priming coat hardener react at ambient temperatures; and wherein the hydroxylated vinyl terpolymer of the nonskid coat base component and the polyisocyanate of the nonskid coat hardener react at ambient temperatures.

2. The surfacing of claim 1 wherein said priming coat has a thickness of 30 to 100 microns and said nonskid coat has a thickness of 300 to 1,000 microns.

3. The surfacing of claim 1 wherein the hydroxylated vinyl terpolymer of said priming coat base component comprises 65 to 95% by weight vinyl chloride and a maximum amount of 10% by weight vinyl ester.

4. The surfacing of claim 3 wherein said priming base component comprises:

5 to 25% by weight of said hydroxylated vinyl terpolymer;

0 to 10% by weight of a copolymer of vinyl chloride and a partially hydrolyzed vinyl ester, said vinyl chloride-vinyl ester copolymer comprising 80 to 90% by weight of vinly chloride and a maximum amount of 20% by weight vinyl ester;

1 to 40% by weight antimony oxide;

5 to 30% by weight of a corrosion-inhibiting pigment;

0 to 20% by weight of color pigments and fillers;

10 to 50% by weight of oxygenated solvents; and 0 to 40% by weight of aromatic solvents.

5. The surfacing of claim 4 wherein the polyisocyanate of said priming coat hardener comprises 10 to 40% by weight isocyanate groups, and wherein said priming coat hardener comprises 0 to 60% by weight of a solvent for said polyisocyanate, said solvent being selected from the group consisting of aromatic solvents, esters, glycol ether esters and ketones.

6. The surfacing of claim 5 wherein said polyisocyanate is aromatic.

7. The surfacing of claim 1 wherein the hydroxylated vinyl terpolymer of said nonskid coat base component comprises 65 to 95% by weight vinyl chloride, a maximum amount of 10% by weight vinyl ester, and a hydroxylated ester which comprises 1 to 4% by weight hydroxy groups.

8. The surfacing of claim 7 wherein said nonskid coat base component comprises:
   1 to 25% by weight of said hydroxylated vinyl terpolymer;
   0.1 to 25% by weight of a second vinyl terpolymer, said second vinyl terpolymer comprising 2 to 5% by weight hydroxy groups;
   1 to 40% by weight antimony oxide;
   0 to 20% by weight of a rough-surfaced lamellar mineral filler;
   2 to 70% by weight of said nonskid aggregate;
   10 to 50% by weight of oxygenated solvents; and
   0 to 40% by weight of aromatic or aliphatic solvents.

9. The surfacing of claim 8 wherein said rough-surfaced lamellar mineral filler comprises a mixture of chlorite, mica and quartz.

10. The surfacing of claim 8, wherein the polyisocyanate of said nonskid coat hardener comprises 10 to 40% by weight isocyanate groups, and wherein said nonskid coat hardener comprises 0 to 70% by weight of a solvent for said polyisocyanate, said solvent being selected from the group consisting of aromatic solvents, esters, glycol ether esters and ketones.

11. The surfacing of claim 10 wherein said polyisocyanate is aliphatic.

12. The surfacing of claim 4, wherein said priming coat base component comprises:
   12% by weight of said hydroxylated vinyl terpolymer;
   2% by weight of said vinyl chloride-vinyl ester copolymer;
   15 to 20% by weight antimony oxide;
   10 to 15% by weight of said corrosion-inhibiting pigment;
   34% by weight oxygenated solvents; and
   14% by weight aromatic solvents.

13. The surfacing of claim 5, wherein the polyisocyanate of said priming coat hardener comprises 22% by weight isocyanate groups, and wherein said priming coat hardener comprises 33% by weight solvent.

14. The surfacing of claim 13, wherein said polyisocyanate is aromatic.

15. The surfacing of claim 8, wherein the nonskid coat base component comprises:
   17.5% by weight of said hydroxylated vinyl terpolymer;
   4.5% by weight of said second vinyl terpolymer;
   12.5% by weight antimony oxide;
   10% by weight of said rough-surfaced lamellar mineral filler;
   25% by weight of said nonskid aggregate;
   21% by weight oxygenated solvent; and
   8% by weight aromatic or aliphatic solvent.

16. The surfacing of claim 10, wherein the polyisocyanate of said nonskid coat hardener comprises 17.5% by weight isocyanate groups, and wherein said nonskid coat hardener comprises 25% by weight solvent.

17. The surfacing of claim 16, wherein said nonskid coat hardener comprises an aliphatic polyisocyanate.

* * * * *